US012562405B2

(12) United States Patent
Park et al.

(10) Patent No.: US 12,562,405 B2
(45) Date of Patent: Feb. 24, 2026

(54) INTERNAL SHORT CIRCUIT INDUCTION APPARATUS AND METHOD FOR BATTERIES

(71) Applicant: LG ENERGY SOLUTION, LTD., Seoul (KR)

(72) Inventors: Jin Soo Park, Daejeon (KR); Jong Hyun Jo, Daejeon (KR); Han Sol Lee, Daejeon (KR); Yeong Ik Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 18/038,168

(22) PCT Filed: Nov. 8, 2022

(86) PCT No.: PCT/KR2022/017491
§ 371 (c)(1),
(2) Date: May 22, 2023

(87) PCT Pub. No.: WO2023/101245
PCT Pub. Date: Jun. 8, 2023

(65) Prior Publication Data
US 2024/0372155 A1      Nov. 7, 2024

(30) Foreign Application Priority Data
Dec. 1, 2021      (KR) ........................ 10-2021-0170013

(51) Int. Cl.
*H01M 10/42*      (2006.01)
*H01M 10/0525*      (2010.01)
(Continued)

(52) U.S. Cl.
CPC ... *H01M 10/4235* (2013.01); *H01M 10/0525* (2013.01); *H01M 10/058* (2013.01); *H01M 50/581* (2021.01)

(58) Field of Classification Search
CPC ............. H01M 50/574; H01M 50/571; H01M 10/4235; H01M 10/0525; H01M 10/058
See application file for complete search history.

(56) References Cited

U.S. PATENT DOCUMENTS

2008/0143337 A1      6/2008   Fujikawa et al.
2009/0286148 A1      11/2009  Fujikawa et al.
(Continued)

FOREIGN PATENT DOCUMENTS

CN      108120937 A      6/2018
CN      110380142 A      10/2019
(Continued)

*Primary Examiner* — Matthew J Merkling
(74) *Attorney, Agent, or Firm* — Bryan Cave Leighton Paisner LLP

(57)      ABSTRACT

An internal short circuit induction apparatus for a battery. The internal short circuit induction apparatus includes an electrode assembly including a positive electrode, a negative electrode, and a separator between the positive electrode and the negative electrode. The apparatus further includes a pressing unit movably located above the electrode assembly, a support unit located under the electrode assembly, the support unit being fixed at a position and configured to support the electrode assembly, and a pulling unit configured to pull a separator cover to remove the separator cover from the electrode assembly. The separator includes an opening.

10 Claims, 2 Drawing Sheets

(51) Int. Cl.
  *H01M 10/058*     (2010.01)
  *H01M 50/581*     (2021.01)

(56)          References Cited

U.S. PATENT DOCUMENTS

| | | | |
|---|---|---|---|
| 2010/0209767 | A1 | 8/2010 | Kasamatsu et al. |
| 2010/0279170 | A1* | 11/2010 | Lee ..................... H01M 50/581 |
| | | | 429/163 |
| 2013/0127473 | A1* | 5/2013 | Ikeda ................ H01M 10/0431 |
| | | | 324/426 |
| 2013/0209841 | A1 | 8/2013 | Keyser et al. |
| 2020/0168875 | A1 | 5/2020 | Kim et al. |
| 2022/0045373 | A1 | 2/2022 | Yoon et al. |
| 2022/0057456 | A1* | 2/2022 | Kim ...................... G01R 31/52 |
| 2022/0140401 | A1 | 5/2022 | Kim et al. |
| 2022/0367990 | A1 | 11/2022 | Lee et al. |
| 2024/0204374 | A1* | 6/2024 | Kim ................... H01M 50/449 |

FOREIGN PATENT DOCUMENTS

| | | | |
|---|---|---|---|
| CN | 212379542 | U | 1/2021 |
| EP | 2337139 | A1 | 6/2011 |
| EP | 2157653 | B1 | 5/2014 |
| EP | 3826097 | A1 | 5/2021 |
| JP | 2009-054300 | A | 3/2009 |
| JP | 5209896 | B2 | 6/2013 |
| JP | 2018-113230 | A | 7/2018 |
| JP | 2019-109975 | A | 7/2019 |
| JP | 6631792 | B2 | 1/2020 |
| JP | 2020-149937 | A | 9/2020 |
| KR | 10-2020-0053782 | A | 5/2020 |
| KR | 10-2020-0118958 | A | 10/2020 |
| KR | 10-2021-0017178 | A | 2/2021 |
| KR | 10-2021-0077512 | A | 6/2021 |

* cited by examiner

【FIG. 1】
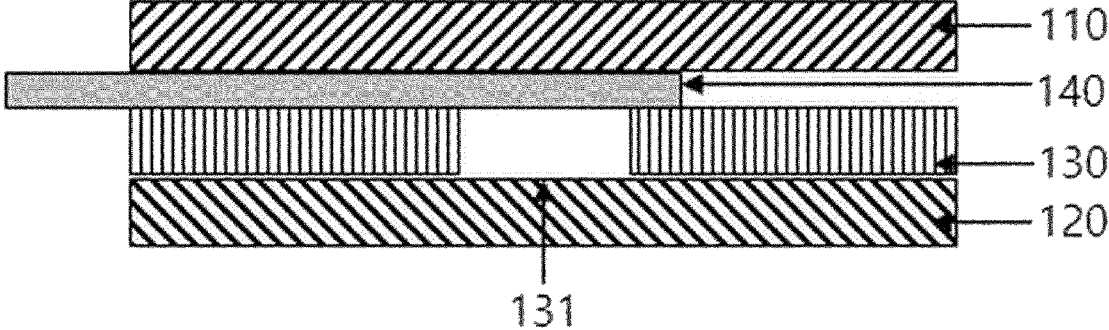
【FIG. 2】
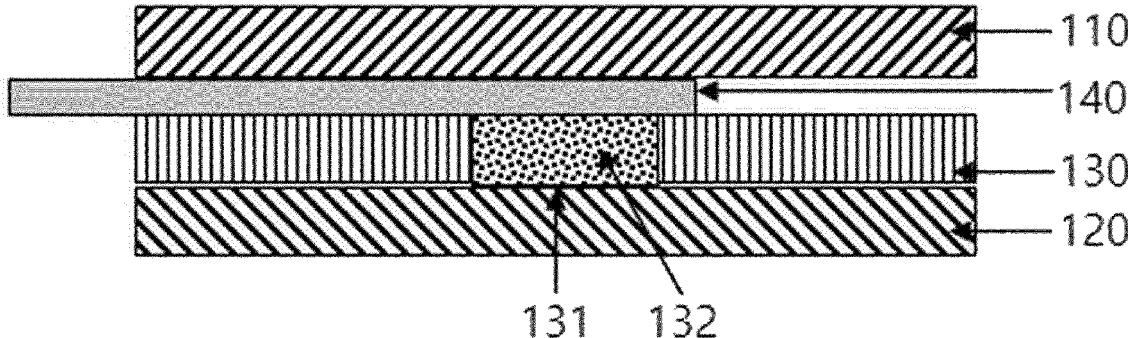
【FIG. 3】
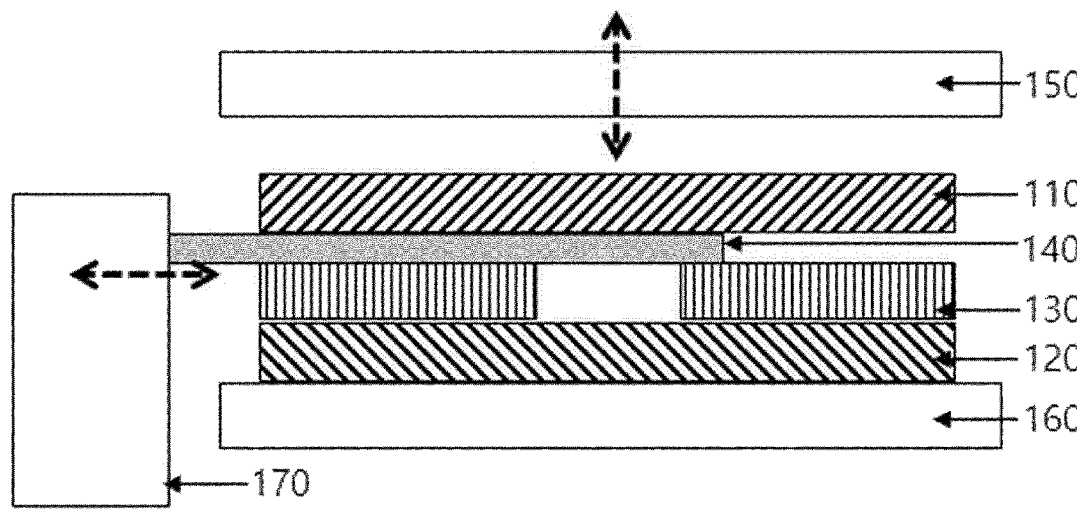

【FIG. 4】
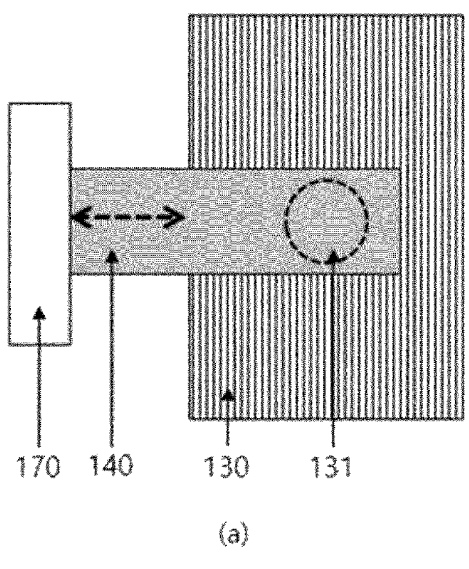
(a)
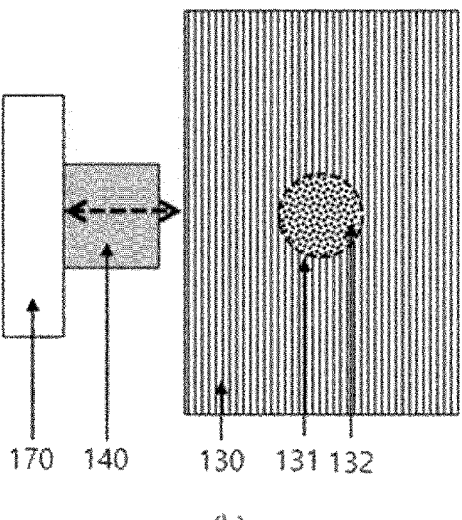
(b)

INTERNAL SHORT CIRCUIT INDUCTION APPARATUS AND METHOD FOR BATTERIES

CROSS-REFERENCE TO RELATED APPLICATION

This application is a National Phase entry pursuant to 35 U.S.C. 371 of International Application No. PCT/KR2022/017491 filed on Nov. 8, 2022, which claims priority to and the benefit of Korean Patent Application No. 2021-0170013 filed on Dec. 1, 2021, the disclosure of which is incorporated herein by reference in its entirety.

TECHNICAL FIELD

The present disclosure relates to an internal short circuit induction apparatus and method for batteries. More particularly, the present disclosure relates to an internal short circuit induction apparatus including a separator cover configured to cover an opening of a separator, wherein the internal short circuit induction apparatus is accurately controlled when an internal short circuit test for batteries is performed in order to achieve a consistent short circuit induction effect, and an internal short circuit induction method for batteries using the same.

BACKGROUND

With a rise in price of energy sources due to depletion of fossil fuels and amplified concern about environmental pollution, demand for environmentally-friendly alternative energy sources as an essential factor for future life has increased. In particular, with increasing technological development of mobile devices and increasing demand therefor, demand for secondary batteries as energy sources has rapidly increased.

Typically, demand for a prismatic secondary battery or a pouch-shaped secondary battery, which has a small thickness and is applicable to products, such as a mobile phone, is high in terms of the shape of the battery, and demand for a lithium secondary battery having high energy density, discharge voltage, and output stability, such as a lithium ion battery or a lithium ion polymer battery, is high in terms of the material for the battery.

In general, a secondary battery is manufactured by applying an electrode mixture including an electrode active material to the surface of a current collector to manufacture a positive electrode and a negative electrode, interposing a separator between the positive electrode and the negative electrode to manufacture an electrode assembly, mounting the electrode assembly in a cylindrical or prismatic metal can or a pouch-shaped case made of an aluminum laminate sheet, and injecting mainly a liquid electrolyte into the electrode assembly or impregnating the electrode assembly with the liquid electrolyte or using a solid electrolyte.

In addition, the secondary battery may be classified depending on the structure of the electrode assembly including the positive electrode, the separator, and the negative electrode. Typically, the electrode assembly may be a jelly-roll type (wound type) electrode assembly, which is configured to have a structure in which long sheet type positive electrodes and long sheet type negative electrodes are wound in the state in which separators are interposed respectively therebetween, a stacked type electrode assembly, which is configured to have a structure in which a plurality of positive electrodes cut so as to have a predetermined size and a plurality of negative electrodes cut so as to a predetermined size are sequentially stacked in the state in which separators are disposed respectively between the positive electrodes and the negative electrodes, or a stacked and folded type electrode assembly, which is configured to have a structure in which bi-cells or full cells, each of which is configured such that a predetermined number of positive electrodes and a predetermined number of negative electrodes are stacked in the state in which separators are disposed respectively between the positive electrodes and the negative electrodes, are wound using a separator sheet.

Meanwhile, an electrode generates current through ion exchange, and each of a positive electrode and a negative electrode constituting the electrode is configured to have a structure in which an electrode active material is applied to an electrode current collector made of a metal.

In general, the negative electrode is configured to have a structure in which a carbon-based active material is applied to an electrode sheet made of copper, aluminum, etc., and the positive electrode is configured to have a structure in which an electrode sheet made of aluminum, etc. is coated with an active material made of $LiCoO_2$, $LiMnO_2$, $LiNiO_2$, etc.

In order to manufacture the positive electrode or the negative electrode, an electrode mixture including an electrode active material is applied to an electrode current collector made of a metal sheet that is long in one direction.

The separator is located between the positive electrode and the negative electrode of the battery to isolate the positive electrode and the negative electrode from each other, and retains the electrolytic solution to provide a path for ionic conduction.

The secondary battery is a rechargeable battery manufactured using a material configured to allow oxidation-reduction reaction between current and the material to repeatedly occur a plurality of times. When reduction reaction occurs for the material due to current, the secondary battery is charged. When oxidation reaction occurs for the material, the secondary battery is discharged. Electricity is generated as the result of repeated charging and discharging.

A lithium secondary battery exhibits excellent electrical properties; however, there is a problem in that safety of the lithium secondary battery is low. For example, when an active material or an electrolyte, which is a component of the lithium secondary battery, is decomposed in an abnormal operation state of the battery, such as overcharging, over-discharging, exposure to a high temperature, and electrical short circuit, heat and gas are generated from the lithium secondary battery, and high-temperature and high-pressure conditions caused therefrom further accelerate the decomposition, whereby ignition or explosion of the lithium secondary battery occurs.

In addition, it is very important to secure safety of the battery even when internal short circuit occurs in the battery. To this end, it is important to properly evaluate safety of the battery when internal short circuit occurs. A battery evaluation test of evaluating the heat generation behavior of a battery, such as a lithium secondary battery, when internal short circuit occurs as a safety item of the battery is prescribed as UL standards for lithium batteries (UL1642) and guidelines of the battery industry association (SBA G1101-1997 Guidelines for evaluating safety of lithium secondary battery). Conventionally, a method of introducing a heating element and generating heat in the heating element in order to induce internal short circuit, a method of boring a separator in the battery in advance and treating the bored portion with a chemical such that the bored portion is melted at a predetermined temperature, a method of introducing a metal material having a predetermined shape, applying external force to tear the separator, thereby inducing internal short circuit, or a method of forming a hole in the separator and pressing the separator was used. In the first method, however, the shape of the battery is different from the shape of a product that is actually used due to the heating element in the cell and an external heat source. In the second method, a separator that is actually used must be deformed and a damaged portion of the separator is chemically treated, whereby the properties of the battery may be different from the properties of existing products, and desired reaction may not occur due to side reaction caused by the cell chemistry. In the third method, the internal short circuit induction apparatus for batteries uses a method of forming a hole in the separator and pressing the separator; however, internal short circuit does not occur at once, and internal short circuit resistance is changed over time, whereby it is difficult to obtain consistent experimental results.

That is, an internal short circuit induction apparatus for batteries including a separator cover configured to cover a separator having an opening formed therein in order to derive consistent and uniform internal short circuit resistance when internal short circuit is induced in a battery and an internal short circuit induction method for batteries using the same have not yet been disclosed.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure has been made in view of the above problems, and it is an object of the present disclosure to provide an internal short circuit induction apparatus including a separator cover configured to cover an opening of a separator, wherein the internal short circuit induction apparatus is accurately controlled when an internal short circuit test for batteries is performed in order to achieve a consistent short circuit induction effect, and an internal short circuit induction method for batteries.

An internal short circuit induction apparatus for a battery according to the present disclosure to accomplish the above object may include an electrode assembly comprising a positive electrode, a negative electrode, and a separator (between the positive electrode and the negative electrode, a pressing unit movably located above the electrode assembly, a support unit located under the electrode assembly, the support unit being fixed at a position and configured to support the electrode assembly, and a pulling unit configured to pull a separator cover to remove the separator cover from the electrode The separator may be include at least one opening.

In addition, the opening may be filled with a conductive material (132).

In addition, opening may have an average diameter of 10 μm to 2 mm.

In addition, the separator cover may be disposed between the separator and the positive electrode and/or the negative electrode.

In addition, the separator cover may completely cover the opening abutting the positive electrode and/or the negative electrode.

In addition, the conductive material may be a metal piece. The conductive material may have a planar shape or metal powder. A size of the conductive material may be equal to a size of the opening or an amount of metal powder corresponding to the size of the opening.

In addition, the present disclosure provides an internal short circuit induction method for a battery, the internal short circuit induction method may include preparing an electrode assembly including a separator between a positive electrode and a negative electrode, and a separator cover between the separator and the positive electrode, disposing the electrode assembly between a support unit and a pressing unit, pulling the separator cover using a pulling unit, and pressing the electrode assembly using the pressing unit. The separator may include an opening, and the opening may be filled with a conductive material.

In addition, the conductive material may be a metal piece. The conductive material may include a planar shape or metal powder. A size of the conductive material may be equal to a size of the opening or an amount of the metal powder corresponding to the size of the opening.

In addition, the pulling unit may pull the separator cover in a direction perpendicular to a stacking direction to remove the separator cover when internal short circuit is induced in the battery.

As is apparent from the above description, an internal short circuit induction apparatus and method for batteries have an effect in that accurate contact of a metal piece is achieved when a separator is removed and pressing is performed.

In addition, the internal short circuit induction apparatus and method for batteries have an effect in that, when nickel powder type metal, which is a conductive material, is inserted into an opening of the separator, the opening is easily filled with the metal, since the metal is powder, and electrical conductivity of the metal is high, which is advantageous in simulating internal short circuit resistance.

In addition, the internal short circuit induction apparatus and method for batteries have an effect in that it is possible to sense short circuit between electrodes at a specific SOC and to generate short circuit in the battery in the state in which the battery is actually driven without disassembly of the battery.

In addition, the internal short circuit induction apparatus and method for batteries have an effect in that it is possible to induce internal short circuit after degradation as well as in the initial state, and therefore it is possible to efficiently evaluate stability of the battery.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a sectional view showing a separator cover disposed on one surface of an open separator according to an embodiment of an internal short circuit induction apparatus for batteries according to the present disclosure.

FIG. 2 is a sectional view showing the separator cover disposed on one surface of a conductive material filling the opening of the separator according to the embodiment of the internal short circuit induction apparatus for batteries according to the present disclosure.

FIG. 3 is a sectional view of an internal short circuit induction apparatus for batteries including a pressing unit, a support unit, and a separator cover pulling unit according to the embodiment of the internal short circuit induction apparatus for batteries according to the present disclosure.

FIG. 4 is a top view showing the change in position of the separator cover due to driving of the pulling unit according to the embodiment of the internal short circuit induction apparatus for batteries according to the present disclosure.

DETAILED DESCRIPTION

Now, preferred embodiments of the present disclosure will be described in detail with reference to the accompanying drawings such that the preferred embodiments of the present disclosure can be easily implemented by a person having ordinary skill in the art to which the present disclosure pertains.

In describing the principle of operation of the preferred embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations.

In the case in which one part is said to be connected to another part in the entire specification, not only may the one part be directly connected to the other part, but also, the one part may be indirectly connected to the other part via a further part.

In addition, that a certain element is included does not mean that other elements are excluded, but means that such elements may be further included unless mentioned otherwise.

Hereinafter, the present disclosure will be described in more detail.

FIG. 1 is a sectional view showing a separator cover disposed on one surface of an open separator according to an embodiment of an internal short circuit induction apparatus for batteries according to the present disclosure.

An internal short circuit test, which is a test of evaluating tolerance against internal short circuit, among battery safety tests, is a test of simulating the case in which short circuit occurs between a positive electrode and a negative electrode in a battery. In the internal short circuit test, a fully charged battery to be evaluated is prepared, internal short circuit is generated, and the behavior of the battery is evaluated. In general, when internal short circuit occurs, the battery is discharged, whereby the voltage of the battery is reduced. The test is performed to evaluate whether the battery has ruptured, the voltage of the battery, the temperature of the battery, etc. until the voltage of the battery is reduced to a predetermined value or less.

For a lithium ion secondary battery, oxidation-reduction reaction occurs as the result of lithium ions moving between the positive electrode and the negative electrode. For a battery in which a conventional internal short circuit induction apparatus is installed, as described above, movement of lithium ions is impossible due to an aluminum sheet and a copper sheet at the part at which the internal short circuit induction apparatus is installed, whereby a non-reaction area is formed. Due to the non-reaction area, the battery performance, such as capacity, is reduced, compared to existing batteries, and it is difficult to accurately simulate the behavior of the battery when internal short circuit occurs, whereby accuracy in safety evaluation is reduced.

An opening capable of inducing internal short circuit may have various shapes. The opening may be hole, such as a circular hole, in terms of adhesion stability and structural stability, and the opening may be performed so as to have various shapes.

The outer periphery of the opening further includes an adhesive layer for tight contact with the electrode. The adhesive layer may be formed at the part at which the outer periphery is brought into contact with the separator, and one or more adhesive layers may be formed at the opening.

Polyvinylidene fluoride (PVDF) or silver paste may be used as the adhesive, and the kind of a chemical material is not particularly restricted as long as the material does not affect the nature of the separator having the opening formed therein of the internal short circuit induction apparatus and the electrode and is designed to allow electrical conduction between the internal short circuit induction apparatus and the electrode therethrough.

In addition, it is preferable to use a material that does not impede electrical connection between the opening and the electrode in order to generate internal short circuit when the opening and the electrode are brought into contact with each other as the chemical material.

Among the chemical materials, PVDF, which is a material used as a binder of the electrode, has a merit in that PVDF exhibits excellent chemical resistance, which is a merit of a fluorine resin, and has good mechanical, thermal, and electrical properties. The silver paste may be used as the adhesive of the internal short circuit induction apparatus in order to achieve adhesion and electrical connection of the internal short circuit induction apparatus.

The outer periphery of the opening may be brought into tight contact with the electrode, and may not form the adhesive layer with the separator cover.

The internal short circuit induction apparatus for batteries may be an internal short circuit induction apparatus for batteries including an electrode assembly including a positive electrode, a negative electrode, and a separator interposed between the positive electrode and the negative electrode, wherein the separator is provided with one or more openings.

FIG. 2 is a sectional view showing the separator cover disposed on one surface of a conductive material filling the opening of the separator according to the embodiment of the internal short circuit induction apparatus for batteries according to the present disclosure.

In the internal short circuit induction apparatus for batteries, a separate separator coupled to the separator provided with the hole and a copper metal piece, which is a conductive material, is provided in the battery, and the internal short circuit induction apparatus may be constituted by a pressing unit configured to press the battery from the outside and a removal unit configured to remove the separator cover.

The metal piece may have a disc shape or a nickel powder shape.

In addition, the openings may be filled with the conductive material.

In addition, the average diameter of the openings may be 10 μm to 2 mm.

If the size of the opening formed in the separator is less than 10 μm, lithium ion permeability is reduced, whereby a reaction area may not be sufficiently formed. If the size of a pore is greater than 2 mm, the volume of the separator is excessively reduced, whereby the structure of the separator is weakened. As a result, an internal short circuit effect through the opening may not be sufficiently achieved, and the separator may be easily damaged by external factors.

In addition, the average diameter of the openings may be 0.3 to 2 cm, more preferably 0.3 to 1.5 cm. When the diameter of the opening is within the above range, the structure of the internal short circuit induction apparatus may not be easily destroyed even when external force is applied to the electrode assembly, and internal short circuit may be effectively generated.

If the diameter of the opening is less than 0.3 cm, the size of the internal short circuit induction apparatus may be excessively small, whereby short circuit may occur at a small area, and therefore a short circuit effect may not be sufficient. If the diameter of the opening is greater than 2 cm, the internal short circuit induction apparatus 200 may be easily bent or deformed when external force is applied to the electrode assembly, whereby the internal short circuit induction apparatus may be destroyed.

In addition, a separator cover interposed between the separator and the positive electrode and/or the negative electrode may be included.

The separator cover may be made of the same material as the separator.

The separator cover may have conductivity equal to or lower than the conductivity of the separator.

The thickness of the separator cover may be equal to or less than the thickness of the separator. The thickness may be 10 μm to 500 μm. If the thickness deviates from the above range, the separator cover may not be easily removed.

In addition, the separator cover may completely cover the opening abutting the electrode.

In addition, a pressing unit movably located above the electrode assembly, a support unit located under the electrode assembly, the support unit being configured to support the electrode assembly in the state in which the position of the support unit is fixed, and a pulling unit configured to pull the separator cover in order to remove the separator cover from the electrode assembly may be included.

An embodiment of the pulling unit may be a towing unit. When the separator cover is connected to one end of the towing unit and the towing unit is driven at the time when the separator cover is to be removed, the separator cover may be pulled and removed.

An embodiment of the pulling unit may be a removal bar formed at one side of a rotary motor. When the motor is driven at the time when the separator cover is to be removed, the removal bar formed at one side of the motor may pull the separator cover while hitting the separator cover, whereby the separator cover may be removed.

The pulling unit may be a roller.

In addition, the conductive material may be a metal piece having a shape and size equal to the planar shape and size of the opening or metal powder capable of filling the opening.

The conductive material may be a metal material that does not react with a component, such as an electrolytic solution, and exhibits good electrical conductivity, preferably one selected from the group consisting of aluminum, copper, and titanium, more preferably aluminum or copper.

FIG. 3 is a sectional view of an internal short circuit induction apparatus for batteries including a pressing unit, a support unit, and a separator cover pulling unit according to the embodiment of the internal short circuit induction apparatus for batteries according to the present disclosure.

In addition, the present disclosure may provide an internal short circuit induction method for batteries, the internal short circuit induction method including a step of preparing an electrode assembly including a separator interposed between a positive electrode and a negative electrode, and a separator cover interposed between the separator and the positive electrode, a step of disposing the electrode assembly between a support unit and a pressing unit, a step of pulling the separator cover using a pulling unit, and a step of pressing the electrode assembly using the pressing unit, wherein the separator is provided with at least one opening, and the opening is filled with a conductive material.

In addition, the conductive material may be a metal piece having a shape and size equal to the planar shape and size of the opening or metal powder.

FIG. 4 is a top view showing the change in position of the separator cover due to driving of the pulling unit according to the embodiment of the internal short circuit induction apparatus for batteries according to the present disclosure.

(a) of FIG. 4 is a view showing the separator cover that covers the opening of the separator, and (b) of FIG. 4 is a view showing the separator cover removed from the opening of the separator by the pulling unit.

Although the specific details of the present disclosure have been described in detail, those skilled in the art will appreciate that the detailed description thereof discloses only preferred embodiments of the present disclosure and thus does not limit the scope of the present disclosure. Accordingly, those skilled in the art will appreciate that various changes and modifications are possible, without departing from the category and the technical idea of the present disclosure, and it will be obvious that such changes and modifications fall within the scope of the appended claims.

DESCRIPTION OF REFERENCE NUMERALS

100: Internal short circuit induction apparatus
110: Positive electrode
120: Negative electrode
130: Separator
131: Opening
132: Conductive material
140: Separator cover
150: Pressing unit
160: Support unit
170: Pulling unit

The invention claimed is:

1. An internal short circuit induction apparatus for a battery, the internal short circuit induction apparatus comprising:

an electrode assembly comprising a positive electrode, a negative electrode, and a separator between the positive electrode and the negative electrode;

a pressing unit movably located above the electrode assembly;

a support unit located under the electrode assembly, the support unit being fixed at a position and configured to support the electrode assembly; and a pulling unit configured to pull a separator cover to remove the separator cover from the electrode assembly, wherein the separator comprises an opening.

2. The internal short circuit induction apparatus according to claim 1, wherein the opening is filled with a conductive material.

3. The internal short circuit induction apparatus according to claim 1, wherein the opening has an average diameter of 10 μm to 2 mm.

4. The internal short circuit induction apparatus according to claim 1, wherein the separator cover is disposed between the separator and the positive electrode and/or the negative electrode.

5. The internal short circuit induction apparatus according to claim 4, wherein the separator cover completely covers the opening abutting the positive electrode and/or the negative electrode.

6. The internal short circuit induction apparatus according to claim 4, wherein the separator cover has a smaller thickness than the separator.

7. The internal short circuit induction apparatus according to claim 2, wherein the conductive material is a metal piece, wherein the conductive material comprises a planar shape or metal powder, and wherein a size of the conductive material is equal to a size of the opening or an amount of the metal powder corresponds to the size of the opening.

8. An internal short circuit induction method for a battery, the internal short circuit induction method comprising:

preparing an electrode assembly comprising a separator between a positive electrode and a negative electrode, and a separator cover between the separator and the positive electrode;

disposing the electrode assembly between a support unit and a pressing unit;

pulling the separator cover using a pulling unit; and pressing the electrode assembly using the pressing unit, wherein the separator comprises an opening, and wherein the opening is filled with a conductive material.

9. The internal short circuit induction method according to claim 8, wherein the conductive material is a metal piece, wherein the conductive material comprises a planar shape or metal powder, and wherein a size of the conductive material is equal to a size of the opening or an amount of the metal powder corresponds to the size of the opening.

10. The internal short circuit induction method according to claim 8, wherein the pulling unit pulls the separator cover in a direction perpendicular to a stacking direction to remove the separator cover when internal short circuit is induced in the battery.

* * * * *